United States Patent
Yoshitomi et al.

(10) Patent No.: US 9,994,227 B2
(45) Date of Patent: Jun. 12, 2018

(54) DRIVING ASSISTANCE DEVICE AND DRIVING ASSISTANCE METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Naoto Yoshitomi, Kariya (JP); Jian Hu, Kariya (JP); Shota Satomura, Kariya (JP); Yusuke Fujimaki, Nissin (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/166,663

(22) Filed: May 27, 2016

(65) Prior Publication Data

US 2016/0347324 A1    Dec. 1, 2016

(30) Foreign Application Priority Data

May 29, 2015  (JP) ................... 2015-110569

(51) Int. Cl.
G06F 7/00 (2006.01)
B60W 40/04 (2006.01)
B60K 35/00 (2006.01)

(52) U.S. Cl.
CPC .............. *B60W 40/04* (2013.01); *B60K 35/00* (2013.01); *B60K 2350/1096* (2013.01);
(Continued)

(58) Field of Classification Search
CPC .............. B60W 40/04; B60W 2420/42; B60W 2420/52; B60W 2520/14; B60W 2540/18;
(Continued)

(56) References Cited

U.S. PATENT DOCUMENTS 6,801,638 B1 * 10/2004 Janssen ................ B60K 35/00
340/910
7,526,103 B2 * 4/2009 Schofield ........... G06K 9/00818
340/435

(Continued)

FOREIGN PATENT DOCUMENTS

JP     2008-189093 A     8/2008

*Primary Examiner* — Anne M Antonucci
*Assistant Examiner* — Kenny A. Taveras
(74) *Attorney, Agent, or Firm* — Knobbe, Martens, Olson & Bear, LLP

(57) ABSTRACT

An ECU as a driving assistance device has a traffic sign detection section, a lane entry detection section and a judgment section. The traffic sign detection section detects traffic signs including a speed limit symbol based on front-image data captured by an in-vehicle camera. The lane entry detection section detects that the own vehicle has entered a ramp lane to leave a highway. The judgment section detects an extent of a current driving lane as the ramp lane when following conditions (c1) and (c2) are satisfied after the lane entry detection section detects the entry of the own vehicle into the ramp lane: (c1) not less than two traffic signs are arranged along the current driving lane in forward direction of the vehicle; and (c2) an arrangement of speed limit symbols included in the detected traffic signs satisfy a predetermined speed reduction pattern.

13 Claims, 3 Drawing Sheets

(52) U.S. Cl.
CPC ..... *B60W 2420/42* (2013.01); *B60W 2420/52* (2013.01); *B60W 2520/14* (2013.01); *B60W 2540/18* (2013.01); *B60W 2540/20* (2013.01)

(58) Field of Classification Search
CPC ............... B60W 2540/20; B60K 35/00; B60K 2350/1096
See application file for complete search history.

(56) References Cited

U.S. PATENT DOCUMENTS

| | | | | |
|---|---|---|---|---|
| 8,180,542 | B2* | 5/2012 | Takeda | B60T 7/22 701/70 |
| 8,463,487 | B2* | 6/2013 | Nielsen | G06Q 10/0631 701/31.4 |
| 8,605,948 | B2* | 12/2013 | Mathony | B60W 50/14 382/104 |
| 8,639,433 | B2* | 1/2014 | Meis | G08G 1/096716 701/116 |
| 8,669,857 | B2* | 3/2014 | Sun | B60Q 9/008 340/425.5 |
| 8,751,154 | B2* | 6/2014 | Zhang | B60W 30/09 348/119 |
| 8,818,042 | B2* | 8/2014 | Schofield | G06K 9/00818 348/211.3 |
| 9,008,369 | B2* | 4/2015 | Schofield | G06K 9/00818 348/211.13 |
| 9,015,100 | B2* | 4/2015 | Kurumisawa | G06N 5/02 706/46 |
| 9,045,139 | B2* | 6/2015 | Chen | B60W 30/14 |
| 9,068,857 | B2* | 6/2015 | Sakaguchi | G01C 21/3626 |
| 9,145,116 | B2* | 9/2015 | Clarke | B60W 30/00 |
| 9,171,217 | B2* | 10/2015 | Pawlicki | B60K 31/0008 |
| 9,177,470 | B2* | 11/2015 | Hamberger | G08G 1/052 |
| 9,187,117 | B2* | 11/2015 | Spero | B62D 1/28 |
| 9,218,535 | B2* | 12/2015 | Wey | G08G 1/09623 |
| 9,283,963 | B2* | 3/2016 | Taner | B60W 30/18163 |
| 9,308,916 | B2* | 4/2016 | Buerkle | B60W 50/14 |
| 9,317,755 | B2* | 4/2016 | Kataoka | G06K 9/00798 |
| 9,436,880 | B2* | 9/2016 | Bos | B60N 2/002 |
| 9,448,074 | B2* | 9/2016 | Mizuno | G09B 29/106 |
| 9,452,676 | B2* | 9/2016 | Oba | B60K 37/02 |
| 9,460,624 | B2* | 10/2016 | Pandita | G08G 1/16 |
| 9,470,791 | B2* | 10/2016 | Yoshimura | B60S 1/0833 |
| 9,499,114 | B2* | 11/2016 | Gross | B60W 50/14 |
| 9,499,169 | B2* | 11/2016 | Obuchi | B60K 31/00 |
| 9,536,155 | B2* | 1/2017 | Takemae | B60R 1/00 |
| 9,594,166 | B2* | 3/2017 | Fukuman | G01S 15/878 |
| 2006/0235597 | A1* | 10/2006 | Hori | B60Q 1/50 701/96 |
| 2012/0002053 | A1* | 1/2012 | Stein | G06K 9/00818 348/148 |
| 2013/0049988 | A1* | 2/2013 | Roeber | G08G 1/09623 340/905 |
| 2014/0188376 | A1* | 7/2014 | Gordon | G08G 1/09 701/118 |
| 2015/0035981 | A1* | 2/2015 | Otsuki | G08G 1/09623 348/148 |
| 2015/0166062 | A1* | 6/2015 | Johnson | B60W 30/12 701/41 |
| 2016/0137127 | A1* | 5/2016 | Yokochi | G06K 9/00798 348/148 |
| 2016/0275793 | A1* | 9/2016 | Yokochi | G06K 9/00818 |
| 2016/0343253 | A1* | 11/2016 | Imai | G06K 9/00818 |
| 2016/0347323 | A1* | 12/2016 | Yoshitomi | B60W 40/04 |
| 2016/0347324 | A1* | 12/2016 | Yoshitomi | B60W 40/04 |
| 2016/0349066 | A1* | 12/2016 | Chung | G01C 21/3415 |
| 2016/0350606 | A1* | 12/2016 | Yoshitomi | G06K 9/00818 |
| 2017/0003134 | A1* | 1/2017 | Kim | B60R 1/00 |

* cited by examiner

Sg1 TO Sg4: TRAFFIC SIGNS (RAMP SIGNS)
Sb: DOWN ARROW SYMBOL (EXIT SYMBOL)
Sa1 TO Sa4: SPEED LIMIT SYMBOLS

SPEED LIMIT SYMBOLS AND EXIT SYMBOL
(DOWN ARROW SYMBOL)
DISPLAYED ON DISPLAY UNIT 31

SPEED LIMIT SYMBOL
DISPLAYED ON
DISPLAY UNIT 31

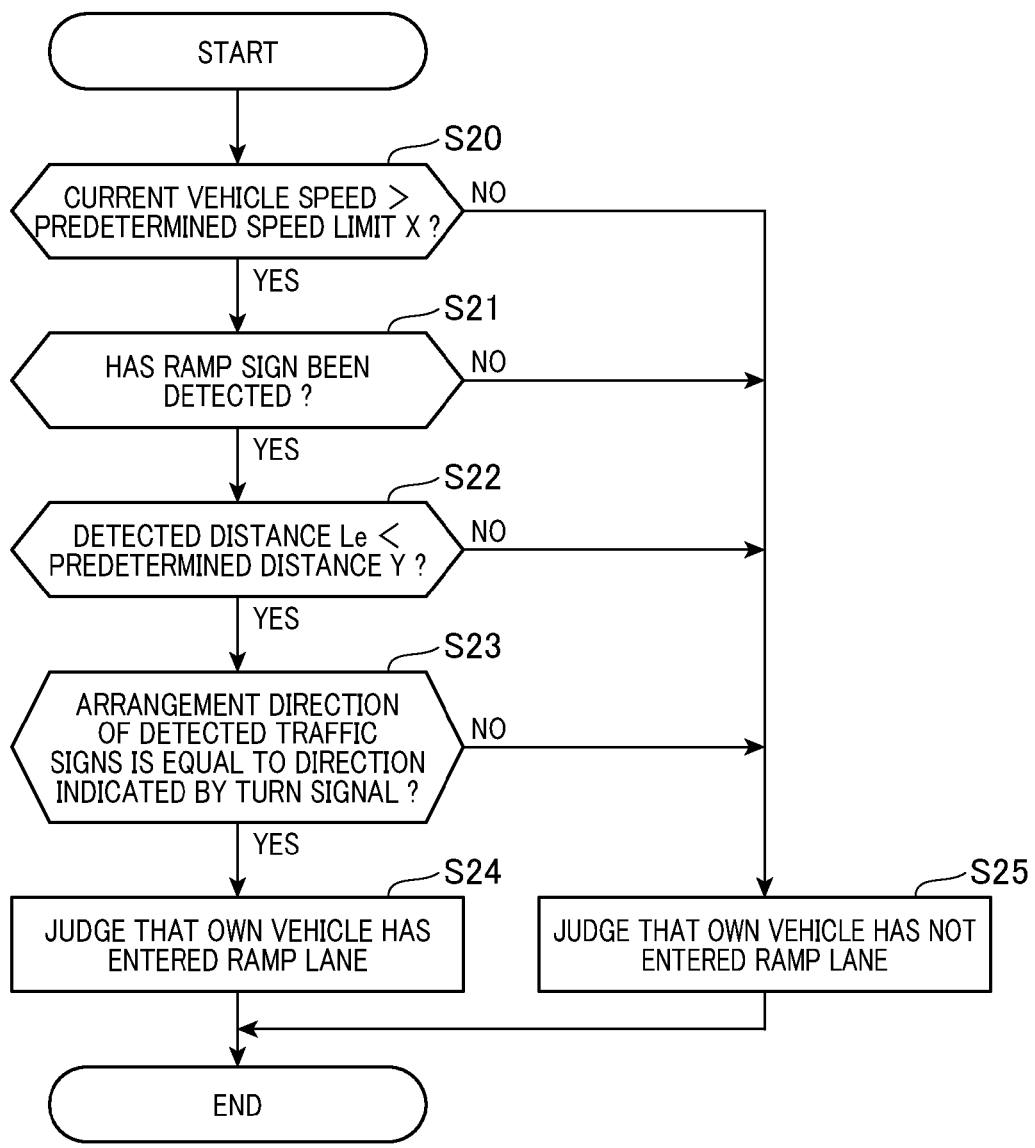

DRIVING ASSISTANCE DEVICE AND DRIVING ASSISTANCE METHOD

CROSS-REFERENCE TO RELATED APPLICATION

This application is related to and claims priority from Japanese Patent Application No. 2015-110569 filed on May 29, 2015, the contents of which are hereby incorporated by reference.

BACKGROUND OF THE INVENTION

1. Field of the Invention

The present invention relates to driving assistance devices and methods capable of detecting and assisting travel of a vehicle on a connection lane, i.e. a ramp lane connected to a driving lane on a highway, through which the vehicle leaves the highway.

2. Description of the Related Art

Recently, there have been proposed driving assistance devices capable of performing driving assistance for the driver of a vehicle. For example, a conventional driving assistance device detects a ramp lane as a connection lane connected to a driving lane on a highway (vehicle roadway), through which the vehicle leaves the highway.

A patent document, Japanese patent laid open publication No. JP 2008-189093 discloses a conventional vehicle driving control device capable of detecting the presence of a ramp lane, i.e. a connection lane connected to a driving lane on a highway, on the basis of navigation information transmitted from a vehicle navigation system mounted on the vehicle. The vehicle driving control device detects entry of the own vehicle into a ramp lane as a connection lane connected to a driving lane on a highway when:

(a) detecting the presence of a ramp lane;

(b) detecting or estimating occurrence of a driver's request to change a current driving lane on a highway; and (c) detecting that the own vehicle crosses a dotted lane boundary line which divides the current driving lane from the ramp lane.

The conventional vehicle driving control device detects that the own vehicle has passed through a connection lane when detecting that the own vehicle has passed through a tollgate or is running on a general roadway or a parking space such as a highway rest stop on the basis of navigation information transmitted from the vehicle navigation system.

However, because the conventional vehicle driving control device disclosed in the patent document previously described detects a place of exit of the ramp lane as a connection lane on the basis of the navigation information transmitted from the vehicle navigation device, if no vehicle navigation system is mounted on a vehicle, it is impossible to apply the vehicle driving control device to the vehicle, and difficult for the driver of the vehicle to correctly detect a place of exit of the ramp lane, i.e. detect whether or not the own vehicle has passed the ramp lane, i.e. passed through the exit of the ramp lane.

SUMMARY

It is therefore desired to provide a driving assistance device capable of correctly detecting completion of driving on a connection lane, i.e. a ramp lane connected to a driving lane on a highway without using navigation information provided from a navigation system.

An exemplary embodiment provides a driving assistance device having a traffic sign detection section, a lane entry detection section and a judgment section. The traffic sign detection section detects traffic signs on a basis of front image data captured by an in-vehicle camera mounted on an own vehicle. Each traffic sign includes at least a speed limit symbol. The lane entry detection section detects that the own vehicle enters a connection lane such as a ramp lane through which the own vehicle leaves a highway. The judgment section detects that a current driving lane, on which the own vehicle travels, is the connection lane when the following conditions (c1) and (c2) are satisfied after the lane entry detection section detects the entry of the own vehicle into the connection lane: (c1) the traffic sign detection section detects not less than two traffic signs which are arranged along the current driving lane in forward direction of the own vehicle, and (c2) an arrangement of speed limit symbols included in the traffic signs detected by the traffic sign detection section in the forward direction of the own vehicle satisfy a predetermined speed reduction pattern.

The driving assistance device according to the present invention detects traffic signs including ramp signs on the basis of front images captured by and transmitted from the in-vehicle camera. Each of the detected traffic signs includes at least a speed limit symbol. The driving assistance device detects the entry of the own vehicle into a connection lane such as a ramp lane. That is, the own vehicle can leave a highway through the connection lane. Under the state in which the entry of the own vehicle into the connection lane has been detected, the driving assistance device detects that a current driving lane is the connection lane, i.e. the ramp lane when the following two conditions (c1) and (c2) are satisfied. (c1) When the traffic sign detection section has detected not less than two traffic signs arranged along the current driving lane in forward direction of the own vehicle, and (c2) an arrangement of speed limit symbols included in the traffic signs detected by the traffic sign detection section in the forward direction of the own vehicle satisfy a predetermined speed reduction pattern.

In general, on the connection lane in the forward direction of a vehicle, not less than two traffic signs, i.e. ramp signs including a speed limit symbol are arranged at relatively narrow intervals. The vehicle can leave a highway through the connection lane, i.e. the ramp lane, and reduce its vehicle speed on the connection lane according to the specific speed reduction pattern indicated by the speed limit symbols included in the traffic signs which have been arranged on the connection lane. Accordingly, it is possible for the driving assistance device to distinguish the connection lane from driving lanes on highways and general roadways, and correctly detect the presence of the connection lane on the basis of the speed reduction pattern of the speed limit symbols in the detected traffic signs such as ramp signs. It is therefore possible for the driving assistance device to detect the place of the exit of the connection lane without using navigation information.

BRIEF DESCRIPTION OF THE DRAWINGS

A preferred, non-limiting embodiment of the present invention will be described by way of example with reference to the accompanying drawings, in which:

FIG. 5 is a flow chart showing a process of detecting entry of the own vehicle into the ramp lane Wr.

DETAILED DESCRIPTION OF THE PREFERRED EMBODIMENTS

Figure 1:
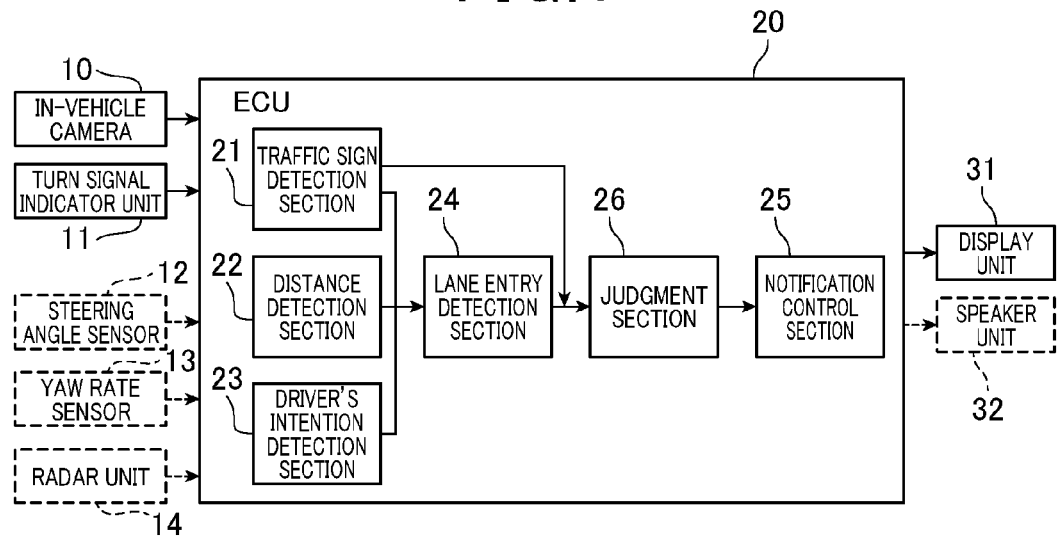
FIG. 1 is a view showing a schematic structure of an ECU 20 as a driving assistance device, various detection devices and sensors mounted on an own vehicle 50 according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a driving assistance device 20 according to an exemplary embodiment with reference to FIG. 1 to FIG. 4.

The driving assistance device 20 according to the exemplary embodiment is mounted on a motor vehicle (hereinafter, the own vehicle 50). The driving assistance device 20 shown in FIG. 1 detects whether or not the own vehicle 50 enters a connection lane, for example, a ramp lane Wr shown in FIG. 2, which is connected to a current driving lane Wh1 on a highway or a freeway on which the own vehicle 50 travels. The driving assistance device 20 performs the driving assistance for the driver of the own vehicle 50.

Figure 2:
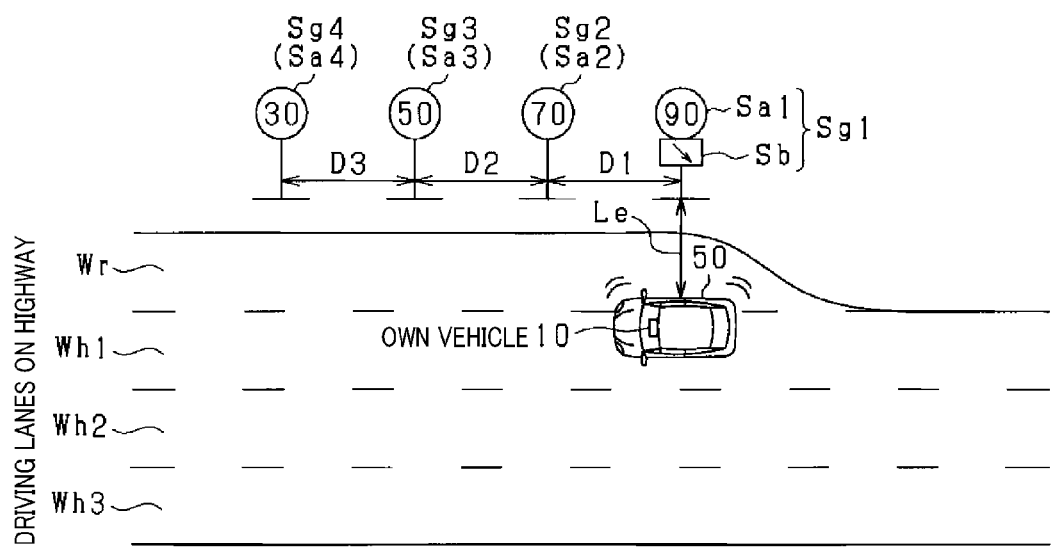
FIG. 2 is a view showing a highway having multiple lanes Wh1, Wh2 and Wh3 and a ramp lane Wr as connection lane, on which the own vehicle 50 travels, and showing traffic signs as ramp signs Sg1, Sg2, Sg3 and Sg4 arranged along the ramp lane Wr branched from a driving lane Wh1 on the highway.

In the following description, the driving assistance device 20 performs the driving assist when the own vehicle 50 is running on the current driving lane on the highway, and enters the ramp lane Wr connected to the current driving lane Wh1 on the highway. As shown in FIG. 2, the ramp lane Wr is arranged at the most right side of the highway.

It is also possible to apply the driving assistance device 20 according to the exemplary embodiment to vehicles used in various countries having different traffic rules. For example, the driving assistance device 20 according to the exemplary embodiment can perform the driving assistance when a vehicle enters a ramp lane which is located at a left side of a highway.

A description will now be given of a schematic structure of the driving assistance device 20 according to the exemplary embodiment with reference to FIG. 1.

FIG. 1 is a view showing a schematic structure of the driving assistance device 20, various detection devices and sensors mounted on an own vehicle 50 according to the exemplary embodiment. As shown in FIG. 1, the driving assistance device 20 according to the exemplary embodiment is an electronic control device (hereinafter, the ECU 20). One or more in-vehicle cameras 10 capture image around the own vehicle 50, and transmits image information regarding the captured image data to the ECU 20. A turn signal indicator unit 11 lights and transmits a turn signal to the ECU 20. The ECU 20 receives the front image information transmitted from the in-vehicle camera 10 and the turn signal transmitted from the turn signal indicator unit 11. The ECU 20 generates and transmits driving information regarding the driving state and the ramp lane to a display unit 31 as one of notification units.

The in-vehicle camera 10 is a monocular camera or a stereo camera composed of a charge coupled device (CCD) image sensor, a complementary metal oxide semiconductor (CMOS) image sensor, a near infrared rays sensor, etc. For example, the in-vehicle camera 10 is mounted at an upper side of a windshield (or a wind screen) of the own vehicle 50. The in-vehicle camera 10 captures front images within a predetermined angle range in front of the own vehicle 50, and sequentially transmits captured front image data to the ECU 20.

The driver of the own vehicle 50 operates the turn signal indicator unit 11 to indicate the direction of turning right or left of the own vehicle 50. The turn signal indicator unit 11 transmits a turning instruction signal to the ECU 20.

The ECU 20 is composed of a central processing unit (CPU), a read only memory (ROM), a random access memory (RAM), an input output interface (I/O interface), etc. The ROM stores various types of control programs in advance. The ECU 20 reads and executes the control programs stored in the ROM, for example. The execution of the programs realizes the functions of a traffic sign detection section 21, a distance detection section 22, a driver's intention detection section 23, a lane entry detection section 24, a notification control section 25 and a judgment section 26.

The traffic sign detection section 21 detects various types of traffic signs, for example, the presence of each of the ramp signs Sg1, Sg2, Sg3 and SG4 as traffic signs on the basis of front image data captured by and transmitted from the in-vehicle camera 10. The ramp signs Sg1, Sg2, Sg3 and Sg4 include at least speed limit symbols Sa1, Sa2, Sa3 and Sa4, respectively.

FIG. 2 is a view showing the highway having the multiple lanes Wh1, Wh2 and Wh3 and the ramp lane Wr, on which the own vehicle 50 travels. The ramp lane Wr is a connection lane arranged between the highway and a general roadway. FIG. 2 shows traffic signs, i.e. the ramp signs Sg1, Sg2, Sg3 and Sg4 installed and arranged along the ramp lane Wr. The ramp lane Wr is branched from the driving lane Wh1 on the highway. That is, FIG. 2 shows an example of right-side traveling on a highway in Europe. The highway has the three driving lanes Wh1, Wh2 and Wh3 on each side. As shown in FIG. 2, the ramp lane Wr is arranged along the driving lane Wh1 located at the most right side in the forward direction of the highway.

The ramp lane Wr is connected to the driving lane Wh1 on the highway at the right side thereof through which the own vehicle 50 leaves the highway. FIG. 2 shows the traffic signs, i.e. the ramp signs Sg1, Sg2, Sg3 and Sg4 located at the right side of the ramp lane Wr. The own vehicle 50 passes through the ramp sign Sg1 installed at the entrance of the ramp lane Wr to leave the highway. In general, the ramp sign Sg1 is not installed on each of the driving lanes Wh1, Wh2, Wh3 on the highway as well as on a general road. Accordingly, when detecting the specific traffic sign, i.e. the ramp sign Sg1, the ECU 20 as the driving assistance device can detect the presence of the ramp lane Wr. FIG. 2 shows the four ramp signs Sg1, Sg2, Sg3 and Sg4 located at the right side of the ramp lane Wr when the own vehicle 50 travels on the ramp lane Wr. However, actual ramp signs Sg1, Sg2, Sg3 and Sg4 are located to face the driver of the own vehicle 50 when the own vehicle 50 is running on the ramp lane WR so that the driver of the own vehicle 50 sequentially recognizes each of the ramp signs Sg1, Sg2, Sg3 and Sg4 in front of the own vehicle 50.

As shown in FIG. 2, the specific traffic sign, i.e. the ramp sign Sg1 installed at the entrance of the ramp lane Wr includes a speed limit symbol Sa1 and an auxiliary sign Sb (down arrow symbol) to provide an indication of a place where the own vehicle 50 leaves the highway. The speed limit symbol indicates an allowed speed limit of the own vehicle 50 on the ramp lane Wr. The auxiliary sign Sb shows a down arrow sign as the exit marker or symbol. The auxiliary sign Sb indicates a lower right direction when the driver of the own vehicle 50 views it from the front side. Accordingly, when the own vehicle 50 goes to the right side on the basis of the auxiliary sign Sb of the ramp sign Sg1, the own vehicle 50 can leave the highway.

In general, ramp signs such as the ramp sign Sg1 are not located on the driving lanes Wh1, Wh2, Wh3 of the highway and also on a general roadway. For this reason, when detecting the ramp sign Sg1, the ECU 20 as the driving assistance device can detect the presence of the ramp lane Wr. Although FIG. 2 shows the three ramp signs Sg installed at the right side of the ramp lane Wr in the forward direction of the own vehicle 50, there are in general various traffic signs as ramp signs located along the shoulder of a ramp lane. For example, one ramp sign includes a speed limit symbol and a down arrow symbol (exit symbol), and other ramp signs include only speed limit symbols, respectively.

As shown in FIG. 2, the ramp sign Sg1 includes the speed limit symbol Sa1 and the down arrow sign Sb. On the other hand, each of the ramp signs Sg2, Sg3 and Sg4 includes only the speed limit symbol Sa2, Sa3, and Sa4, respectively.

The traffic sign detection section 21 performs known pattern matching on the basis of the front image data captured by and transmitted from the in-vehicle camera 10, and detects the ramp signs Sg1 including the speed limit symbol and the down arrow symbol, and the ramp signs Sg2 to Sg4 including a speed limit symbol only.

Various countries use a different exit symbol as one of the auxiliary symbols included in the ramp sign Sg, which provides an indication of a place where the own vehicle 50 may leave the driving lane on the highway. For example, Japan uses a ramp sign Sg including the word "EXIT" which shows the exit from a highway. The traffic sign detection section 21 performs pattern matching of front image data captured by the in-vehicle camera 10 by using pattern data which correspond to the predetermined country or various countries in which the own vehicle travels. The traffic sign detection section 21 detects a traffic sign as the ramp sign Sg including a speed limit symbol Sa1, Sa2, Sa3 or Sa4 on the basis of the results of the pattern matching and the front image data. FIG. 2 shows the four traffic signs Sg1 to Sg4, i.e. the ramp sign Sg1 including the ramp speed limit Sa1 of 90 km and the down arrow sign Sb, the ramp sign Sg2 including the ramp speed limit Sa2 of 70 Km, the ramp sign Sg3 including the ramp speed limit Sa3 of 50 Km, and the ramp sign Sg4 including the ramp speed limit Sa4 of 30 Km.

In general, the number of the traffic signs as the ramp signs is changed on the basis of a distance of the section, i.e. a length of the ramp lane Wr, etc.

The distance detection section 22 detects a distance Le in a width direction of the highway between the own vehicle 50 and the detected traffic sign, i.e. the ramp sign Sg1 detected by the traffic sign detection section 21. In more detail, the distance detection section 22 detects the distance Le between the side surface of the own vehicle 50 and the ramp sign Sg1 on the basis of the front image data captured by the in-vehicle camera 10. It is also acceptable to use another distance between the detected traffic sign, i.e. the ramp sign Sg1 and the center of the own vehicle in a width direction of the driving lanes Wh1, Wh2 or Wh3 on the highway, or between the ramp sign Sg1 and the side surface of the own vehicle 50 on the current driving lane.

The driver's intention detection section 23 detects a driver's intention for the own vehicle 50 to change the current driving lane on the highway on which the own vehicle 50 travels. In more detail, the driver's intend detection section 23 detects the driver's intention for the own vehicle 50, i.e., whether or not the driver of the own vehicle 50 intends to change the driving lane on the highway and a change direction on the basis of the turning instruction signal transmitted from the turn signal indicator unit 11.

The lane entry detection section 24 detects entry of the own vehicle 50 into the ramp lane Wr, i.e. the connection lane connected between the highway and a general road. In more detail, the lane entry detection section 24 detects that the own vehicle 50 has entered the ramp lane Wr when the following four conditions (1) to (4) are satisfied:

(1) the traffic sign detection section 21 detects the presence of at least one ramp sign;
(2) the distance Le detected by the distance detection section 22 is shorter than a predetermined distance Y (m);
(3) the driver's intention detection section 23 detects that the driver intends changing the traveling direction of the own vehicle 50 toward the ramp sign Sg1 corresponding to the forward direction of the own vehicle 50; and
(4) the speed of the own vehicle 50 which has entered the ramp lane Wr is greater than a predetermined speed limit X.

The predetermined distance Y (m) used in the condition (2) has been determined on the basis of the road width of the driving lane on the highway and the road width of the ramp lane. In more detail, the predetermined distance Y (m) used in the condition (2) is determined on the basis of the lane width of the driving lane on the highway adjacent to the ramp lane Wr, and a distance between a lane shoulder of the outermost driving lane on the highway and the ramp sign Sg. For example, the predetermined distance Y (m) used in the condition (2) is approximately 7 m which is a total distance of:

the lane width of the driving lane Wh1 (see FIG. 2) which is adjacent to the ramp lane Wr; and
the lane width of the ramp lane Wr.

In general, the following lane widths have been determined in advance:

the lane width of a driving lane of a highway;
the distance between the outer lane shoulder of the driving lane Wh1 and the ramp sign; and
the lane width of the ramp lane Wr.

When the condition (2) is satisfied, the own vehicle 50 is running on a driving lane close to the ramp lane Wr. That is, the satisfaction of the condition (2) allows the ECU 20 as the driving assistance device to eliminate the process of detecting whether or not the own vehicle 50 on the driving lane Wh2 or the driving lane Wh3 moves to the ramp lane Wr. That is, the satisfaction of the condition (2) can avoid an incorrect detection of the lane change of the own vehicle 50, as the entry of the own vehicle 50 to the ramp lane Wr, when really the vehicle is changing from the driving lane Wh2 to the driving lane Wh1, or from the driving lane Wh3 to the driving lane Wh2.

The condition (3) detects whether or not the own vehicle 50 is driving according to the instruction of the symbol included in the ramp signs Sg1 to Sg4. As shown in FIG. 2, when the own vehicle 50 changes the current driving lane Wh1 toward the right side direction, it is detected that the own vehicle 50 has leaved the current driving lane Wh1 and entered the ramp lane Wr on the basis of the instruction of the down arrow symbol Sb included in the ramp signs Sg. In this case, the own vehicle 50 travels on the basis of the speed limit symbol Sa1 of 90 km included in the ramp sign Sg 1.

On the other hand, as shown in FIG. 2, when the own vehicle 50 changes the current driving lane Wh1 toward the left side direction, for example, into the driving lane Wh2, the own vehicle 50 drives without following the speed limit symbol Sa1 of 90 km included in the ramp sign Sg1. In the latter case, the own vehicle 50 can drive without using the speed limit symbol Sa1 of 90 km included in the ramp sign Sg1.

Because the ramp sign Sg1 is installed at the entrance of the ramp lane Wr, the arrangement direction of the ramp sign Sg1 provides an indication of the forwarding direction of the own vehicle 50 toward which the own vehicle 50 travels on the ramp lane Wr. Further, as shown in FIG. 2, when the ramp sign Sg1 includes the down arrow symbol Sb as an exit symbol to leave the highway, and the down arrow symbol Sb in the ramp sign Sg1 shows the direction to enter the ramp lane Wr, it is acceptable to detect whether or not the travel change direction of the own vehicle 50 is equal to the direction designated by the down arrow symbol Sb included in the ramp sign Sg1.

The predetermined speed limit of the condition (4) is used to avoid occurrence of the incorrect detection of determining that the own vehicle 50 enters the ramp lane Wr when the own vehicle 50 travels on a general roadway, not on a highway.

In general, the ramp signs are not installed on general roadways, but installed on a ramp lane on highways. However, the conventional driving assistance device causes an incorrect recognition of detecting that the own vehicle 50 travels on a highway when the own vehicle 50 travels on a general roadway. The driving assistance device recognizes a traffic sign installed on a general roadway as a ramp sign.

The use of the condition (4) suppresses the driving assistance device of the ECU 20 from incorrectly determining that the own vehicle 50 is entering a ramp lane Wr. For example, the predetermined speed X is determined on the basis of the value of a speed limit used for the driving lanes Wh1, Wh2 and/or Wh3 on the highway.

The judgment section 26 detects the extent of the ramp lane Wr. That is, because no ramp sign is usually present on general roadways, and on the other hand at least one ramp sign is present on each ramp lane, the judgment section 26 detects the extent of the ramp lane Wr when one or more ramp signs are installed along the shoulder of the current driving lane. As previously described, one or more first type ramp signs and at least two second type ramp signs are present on a ramp lane. The first type ramp sign includes a speed limit symbol and an exit symbol, i.e. a down arrow symbol installed at the entrance of the ramp lane. The second type ramp sign includes a speed limit symbol only, not including the down arrow symbol (exit symbol).

Traffic signs are usually installed on general roadways, highways and ramp lanes. Each traffic sign includes a speed limit symbol only and is installed along them. However, the speed limit symbols in the ramp signs on a ramp lane have a unique arrangement which is different from the arrangement of the speed limit symbols in the traffic signs on driving lanes of a highway and a general roadway.

In general, at least two or more ramp signs including a speed limit symbol are installed at relatively narrow intervals along the ramp lane Wr so as to provide an indication to quickly reduce the vehicle speed of the own vehicle 50. In general, the extent of the ramp lane Wr has a short distance. The the ramp lane Wr is located between a highway and a general roadway, and the own vehicle can leave the highway through the ramp lane Wr. The speed limit of each of the speed limit symbols in the ramp signs installed along the ramp lane instructs a vehicle to adequately reduce its vehicle speed from the entrance to the exit of the ramp lane Wr. These ramp signs including a speed limit symbol only are located from the entrance to the exit of the ramp lane Wr in a specific speed reduction pattern in order to adequately reduce the vehicle speed. For example, a speed limit of each of the ramp signs installed along the ramp lane Wr is gradually reduced from the entrance of the ramp lane Wr to the exit from the ramp lane Wr according to the specific reduction pattern of the vehicle speed.

The judgment section 26 judges whether or not the current driving lane is the ramp lane Wr on the basis of the specific arrangement pattern of the speed limit symbols included in at least two or more detected traffic signs (ramp signs).

That is, the judgment section 26 detects that the extent of the current driving lane is equal to the extent of the ramp lane Wr, i.e. the own vehicle 50 is now running on the ramp lane Wr when the following two conditions (c1) and (c2) are satisfied after the own vehicle 50 enters the entrance of the ramp lane Wr:

(c1) the traffic sign detection section 21 detects not less than two traffic signs, for example, ramp signs Sg1 to Sg4 shown in FIG. 2, arranged along the current driving lane in forward direction of the own vehicle 50; and (c2) a speed reduction pattern indicated by speed limit symbols Sa1 to Sa4 included in the traffic signs (such as the ramp signs Sg1 to Sg4) detected by the traffic sign detection section 21 in the forward direction of the own vehicle 50 satisfies the predetermined speed reduction pattern.

The predetermined distance A is equal to the maximum distance between two traffic signs adjacent to each other, each includes a speed limit symbol.

When the ECU 20 can receive information of the ramp lane Wr, for example, transmitted from a vehicle navigation system, etc., it is acceptable to determine the predetermined distance A on the basis of the received information regarding the ramp lane Wr.

In addition, the judgment section 26 detects a completion place of the ramp lane Wr as the exit of the ramp lane Wr when the speed limit of each of the detected traffic signs is reduced according to a pattern which is different from the predetermined reduction pattern or when the distance between the adjacent traffic signs is wider than the predetermined distance A.

For example, it is possible for the judgment section 26 to recognize the traffic sign located before one traffic sign which does not follow the specific reduction pattern of the vehicle speed. Further, it is also possible for the judgment section 26 to recognize the traffic sign including the exit symbol, where the distance between the traffic sign and another traffic sign positioned further closer is longer than the predetermined distance A. The judgment section 26 judges that the ramp lane Wr has the section from the detected entrance to the determined completion place.

As shown in FIG. 2, the traffic signs (as the ramp signs Sg1 to Sg4) are installed along the extent of the ramp lane Wr from the entrance to the exit, and a speed limit value of each of the speed limit symbols Sa1 to Sa4 included in the traffic signs Sg1 to Sg4 are reduced from the entrance toward the exit of the ramp lane Wr. The distance D1 between the traffic signs Sg1 and Sg2 is narrow than the predetermined distance A. The distance D2 between the traffic signs Sg2 and Sg3 is narrow than the predetermined distance A. The distance D3 between the traffic signs Sg3 and Sg4 is narrow than the predetermined distance A.

The traffic sign detection section 21 does not detect any traffic sign at a place within the predetermined distance A outside of the traffic sign Sg4 in the direction toward the exit of the ramp lane Wr. In this case, the judgment section 26 detects that the traffic sign Sg4 is installed at a place of the exit of the ramp lane Wr.

The judgment section 26 detects that the extent of the ramp lane Wr is from the place of the ramp sign Sg1 to the place of the ramp sign Sg4. Usually, a plurality of traffic signs are arranged in the front image data in the forward direction of the own vehicle 50. The judgment section 26 detects the extent of the ramp lane Wr by using a plurality of the continuous front image data captured by and transmitted from the in-vehicle camera 10.

When the own vehicle 50 is running along the ramp lane Wr detected by the judgment section 26, the notification control section 25 notifies, to the driver of the own vehicle 50 through the display unit 31, information regarding the speed limit at the current location of the own vehicle 50 and that the own vehicle 50 is now running on the ramp lane Wr.

Figures 3A, 3B, 3C, 3D:
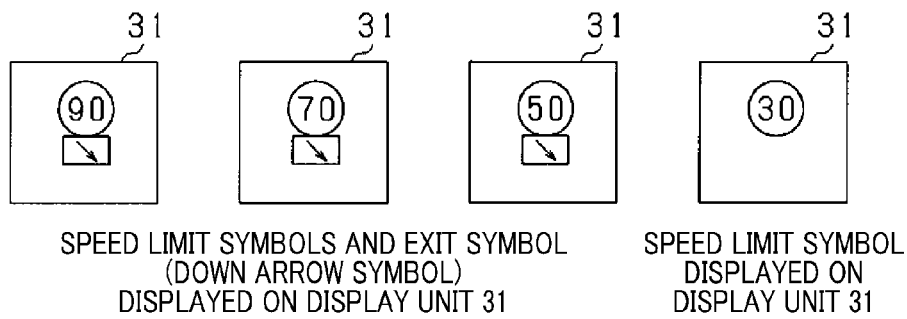
FIG. 3A is a view showing the speed limit symbol Sa1 of 90 km and the auxiliary symbol Sb (down arrow symbol) included in the ramp sign Sg1 located at the entrance of the ramp lane Wr, displayed on the display unit 31.
FIG. 3B is a view showing the speed limit symbol Sa2 of 70 km included in the ramp sign Sg2 and the auxiliary symbol Sb (down arrow symbol), displayed on the display unit 31.
FIG. 3C is a view showing the speed limit symbol Sa3 of 50 km included in the ramp sign Sg3 and the auxiliary symbol Sb (the down arrow symbol), displayed on the display unit 31.
FIG. 3D is a view showing the speed limit symbol Sa4 of 30 km included in the ramp sign Sg4, displayed on the display unit 31.

FIG. 3A is a view showing the traffic information displayed on the display unit 31. That is, FIG. 3A shows the speed limit symbol of 90 km and the down arrow symbol Sb as the auxiliary symbol included in the ramp sign Sg1 which is installed at the entrance of the ramp lane Wr.

As shown in FIG. 3A, the notification control section 25 transmits to the display unit 31 the information regarding the 90 km and the down arrow symbol Sb included in the ramp sign Sg1 during the period from the timing when the lane entry detection section 24 detects entry of the own vehicle 50 into the ramp lane Wr to the timing when the own vehicle 50 has passed through the place of the ramp sign Sg2. When receiving the information transmitted from the notification control section 25, the display unit 31 displays the speed limit symbol Sa1 and the down arrow symbol Sb as the auxiliary symbol included in the ramp sign Sg1.

FIG. 3B is a view showing the traffic information displayed on the display unit 31. That is, FIG. 3B shows the speed limit symbol Sa2 of 70 km included in the ramp sign Sg2 and the down arrow symbol Sb as the auxiliary symbol. The ramp sign Sg2 is located at a place forward the ramp sign Sg1. The speed limit symbol Sa2 of 70 km included in the ramp sign Sg2 and the down arrow symbol Sb are displayed on the display unit 31 when the own vehicle 50 is running on the distance D2 between the ramp sign Sg2 and the ramp sign Sg3 on the ramp lane Wr.

As shown in FIG. 3B, the notification control section 25 transmits to the display unit 31 the information regarding the speed limit symbol Sa2 of 70 km included in the ramp sign Sg2 and the down arrow symbol Sb during the period from the timing when the own vehicle 50 passes through the place of the ramp sign Sg2 to the timing when the own vehicle 50 passes the ramp sign Sg3. When receiving the information transmitted from the notification control section 25, the display unit 31 displays the speed limit symbol Sa2 of 70 km and the down arrow symbol Sb.

FIG. 3C is a view showing the traffic information displayed on the display unit 31. That is, FIG. 3C shows the speed limit symbol Sg3 of 50 km included in the ramp sign Sg3 and the down arrow symbol Sb as the auxiliary symbol. The ramp sign Sg3 is installed at a place before the ramp sign Sg2. The speed limit symbol Sa3 of 50 km included in the ramp sign Sg3 and the down arrow symbol Sb are displayed on the display unit 31 when the own vehicle 50 is running on the distance D3 between the ramp sign Sg3 and the ramp sign Sg4 on the ramp lane Wr.

As shown in FIG. 3C, the notification control section 25 transmits to the display unit 31 information regarding the speed limit symbol Sa3 of 50 km included in the ramp sign Sg3 and the down arrow symbol Sb during the period from the timing when the own vehicle 50 passes through the place of the ramp sign Sg3 to the timing when the own vehicle 50 passes through the place of the ramp sign Sg4. When receiving the information transmitted from the notification control section 25, the display unit 31 displays the speed limit symbol Sa3 of 50 km and the down arrow symbol Sb.

FIG. 3D is a view showing the traffic information displayed on the display unit 31. That is, FIG. 3D shows the speed limit symbol Sg4 of 30 km included in the ramp sign Sg4.

As shown in FIG. 3D, the notification control section 25 transmits to the display unit 31 the information regarding the speed limit symbol Sa4 of 30 km only, included in the ramp sign Sg4 after the own vehicle 50 has passed through the place of the ramp sign Sg4. When receiving the information transmitted from the notification control section 25, the display unit 31 displays the speed limit symbol Sa4 of 30 km only, and does not displays the down arrow symbol Sb. This makes it possible for the driver of the own vehicle 50 to recognize that the own vehicle 50 has passed through the exit of the ramp lane Wr.

The driver of the own vehicle 50 often forgets to reduce the vehicle speed after passing through the entrance of the ramp lane Wr and maintains a high speed of the own vehicle 50 as if they were on the highway. As previously described, when the notification control section 25 provides the instruction to the display unit 31 to display the information regarding the speed limit on the ramp lane Wr, the driver of the own vehicle 50 correctly recognizes that the own vehicle 50 is leaving the highway, and entering the ramp lane Wr. That is, the information regarding such a speed limit provides to the driver of the own vehicle 50 an indication to reduce the current speed of the own vehicle 50 to adopt the allowed speed range of the ramp lane Wr.

The display unit 31 (as the notification device) is a meter display arranged on a vehicle instrument panel, for example. The display unit 31 is composed of a liquid crystal display, etc. When the own vehicle 50 has a car navigation device, it is possible to use the car navigation device as the display unit 31.

A description will now be given of the process of detecting entry of the own vehicle 50 into the ramp lane Wr and notifying the detected situation to the driver of the own vehicle 50 with reference to FIG. 4.

Figure 4:
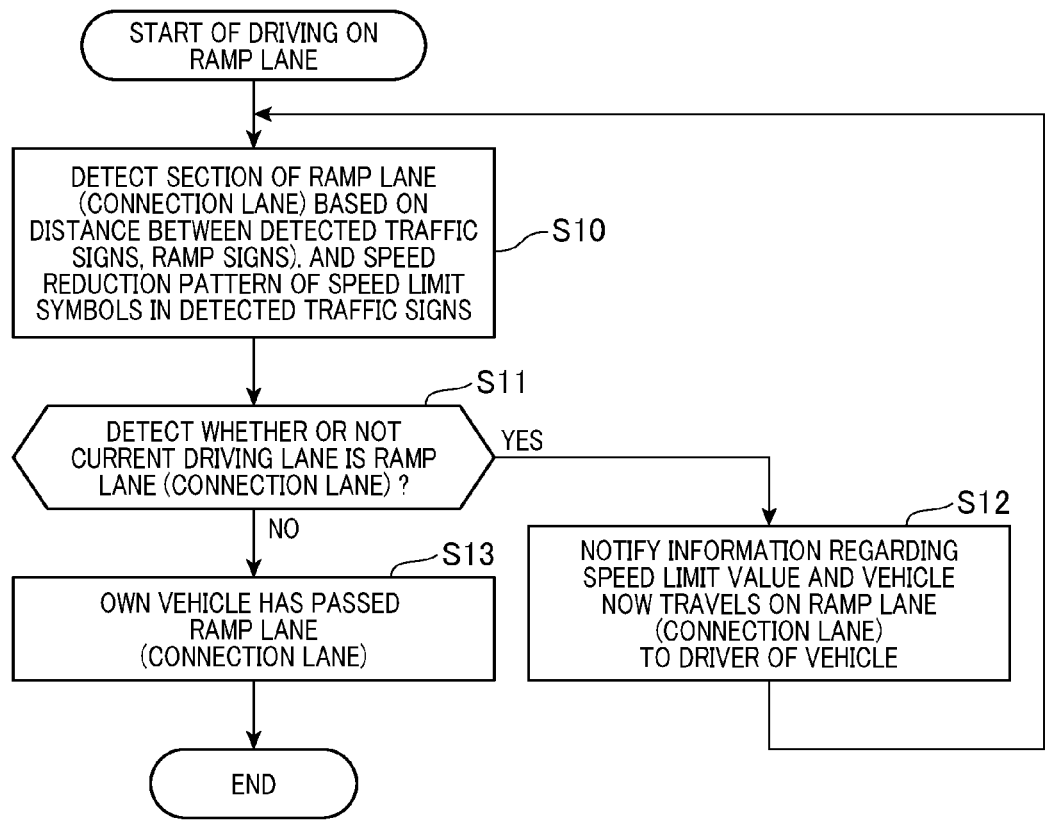
FIG. 4 is a flow chart showing a process of detecting a driving state of the own vehicle 50 on the ramp lane Wr, and notifying the detected state to the driver of the own vehicle 50 through the display unit 31, etc.

FIG. 4 is a flow chart showing the process of detecting a driving state of the own vehicle 50 on the ramp lane Wr, and notifying the detected matter to the driver of the own vehicle 50 through the display unit 31, etc.

The ECU 20 as the driving assistance device according to the exemplary embodiment performs the process shown in FIG. 4 every time when detecting whether the own vehicle 50 is entering the ramp lane Wr. The process of detecting the entry of the own vehicle 50 to the ramp lane Wr will be explained later.

In step S10 shown in FIG. 4, the judgment section 26 in the ECU 20 detects a distance of the ramp lane Wr on the basis of the detected distances, i.e. the distance between the traffic signs Sg1 and Sg2, the distance between the traffic signs Sg2 and Sg3, the distance between the traffic signs Sg3 and Sg4, and the speed reduction pattern. The operation flow progresses to step S11.

In step S11, the judgment section 26 judges whether or not the own vehicle 50 is now running on the ramp lane Wr detected in step S10.

When the result in step S11 indicates affirmation ("YES" in step S11), i.e. indicates that the own vehicle 50 is now running on the ramp lane Wr, the operation flow progresses to step S12.

In step S12, the notification control section 25 provides to the driver of the own vehicle 50 information regarding the speed limit and that the own vehicle is now running on the ramp lane Wr through the display unit 31. The operation flow returns to step S21.

On the other hand, when the result in step S11 indicates negation ("NO" in step S11), i.e. indicates that the own vehicle 50 is not running on the ramp lane Wr, the ECU 20 detects that the own vehicle 50 has passed through the ramp lane Wr, and completes the execution of the process shown in FIG. 4.

A description will now be given of the process of detecting the entry of the own vehicle 50 into the ramp lane Wr with reference to the flow chart shown in FIG. 5.

FIG. 5 is a flow chart showing the process of detecting the entry of the own vehicle 50 into the ramp lane Wr.

The ECU 20 repeatedly performs the process shown in FIG. 5 every time when the in-vehicle camera 1 captures front images and transmits the front image data to the ECU 20 as the driving assistance device according to the exemplary embodiment.

In step S20, the lane entry detection section 24 judges whether or not the current vehicle speed of the own vehicle 50 is higher than the predetermined speed X. That is, the lane entry detection section 24 judges whether or not the condition (4) is satisfied. The condition (4) has been previously explained. When the judgment result is step S20 indicates negation ("NO" in step S20), i.e. the current vehicle speed of the own vehicle 50 is not more than the predetermined speed X, the lane entry detection section 24 judges that the own vehicle 50 has not entered the ramp lane Wr. The ECU 20 completes the process shown in FIG. 5.

On the other hand, when the judgment result is step S20 indicates affirmation ("YES" in step S20), i.e. the current vehicle speed of the own vehicle 50 is higher than the predetermined speed X, the operation flow progresses to step S21.

In step S21, the lane entry detection section 24 judges whether or not the traffic sign detection section 21 has detected the presence of a ramp sign. That is, the lane entry detection section 24 judges whether or not the condition (1) is satisfied.

When the judgment result in step S21 indicates negation ("NO" in step S21), i.e. the traffic sign detection section 21 has not detected any ramp sign, the operation flow progresses to step S25.

In step S25, the lane entry detection section 24 judges that the own vehicle 50 has not entered into the ramp lane Wr. The ECU 20 completes the process shown in FIG. 5.

On the other hand, when the judgment result in step S21 indicates affirmation ("YES" in step S21), i.e. the traffic sign detection section 21 has detected a ramp sign, the operation flow progresses to step S22.

In step S22, the lane entry detection section 24 judges whether or not the detected distance Le between the own vehicle 50 and the detected ramp sign is smaller than the predetermined distance Y (m). That is, the lane entry detection section 24 judges whether or not the condition (2) previously described is satisfied.

When the judgment result in step S22 indicates negation ("NO" in step S22), i.e. the distance Le is not less than the predetermined distance Y (m), the operation flow progresses to step S25.

In step S25, the lane entry detection section 24 judges that the own vehicle 50 has not entered into the ramp lane Wr. The ECU 20 completes the process shown in FIG. 5.

On the other hand, when the judgment result in step S22 indicates affirmation ("YES" in step S22), i.e. the distance Le is narrower than the predetermined distance Y (m), the operation flow progresses to step S23.

In step S23, the lane entry detection section 24 judges whether or not the arrangement direction of the detected ramp signs in the forward direction of the own vehicle 50 is equal to the direction indicated by the turn signal transmitted from the turn signal indicator unit 11. That is, the lane entry detection section 24 judges whether or not the condition (3) previously described is satisfied.

When the judgment result in step S23 indicates negation ("NO" in step S23), i.e., the arrangement direction of the detected ramp signs in the forward direction of the own vehicle 50 is not equal to the direction indicated by the turn signal, the operation flow progresses to step S25.

In step S25, the lane entry detection section 24 judges that the own vehicle 50 has not entered into the ramp lane Wr. The ECU 20 completes the process shown in FIG. 5.

On the other hand, when the judgment result in step S23 indicates affirmation ("YES" in step S23), i.e., the arrangement direction of the detected ramp signs in the forward direction of the own vehicle 50 is equal to the direction indicated by the turn signal, the operation flow progresses to step S24.

In step S24, the lane entry detection section 24 judges that the own vehicle 50 has entered into the ramp lane Wr. The ECU 20 completes the process shown in FIG. 5.

The ECU 20 as the driving assistance device according to the exemplary embodiment has the following effects.

In general, there are installed not less than two traffic signs, i.e. ramp signs including a speed limit symbol at relatively narrow intervals on the ramp lane Wr in the forward direction of the own vehicle 50 on the ramp lane Wr. The own vehicle 50 can leave a highway through the ramp lane Wr. Such a ramp lane Wr has an extent of a short distance to adequately reduce the vehicles peed of the own vehicle 50. The arrangement pattern of the ramp signs is narrower than that of a driving lane on a highway and a general roadway. The ramp signs are arranged on the the ramp lane Wr as a connection lane for the own vehicle 50 to reduce its vehicle speed according to the predetermined speed reduction pattern. Accordingly, it is possible for the ECU 20 as the driving assistance device according to the exemplary embodiment to detect the presence of the ramp lane We on the basis of the arrangement pattern of the traffic signs (as the ramp signs) and the speed reduction pattern of the speed limits included in the detected traffic signs. The traffic signs installed on a ramp lane are different in arrangement pattern and speed reduction pattern from traffic signs installed on a driving lane on a highway and a general roadway. Further, the ECU 20 as the driving assistance device according to the exemplary embodiment can correctly detect the place of the exit of the ramp lane as the connection lane.

The ECU 20 as the driving assistance device according to the exemplary embodiment judges with high accuracy that the own vehicle 50 has already passed through the place of exit of the ramp lane Wr when the detected speed reduction pattern of the speed limit of each of the detected traffic signs is different from the predetermined speed reduction pattern, or when the distance between the adjacent detected traffic patterns is wider than the predetermined distance A. This makes it possible to detect the boundaries of the ramp lane Wr with high accuracy.

During the driving of the own vehicle 50 on the detected ramp lane Wr, the ECU 20 notifies to the driver of the own vehicle 50 the information regarding the speed limit on the ramp lane Wr and that the own vehicle 50 now travel on the ramp lane Wr. This information notifies to the driver of the own vehicle 50 that the own vehicle 50 is now leaving the driving lane on the highway, and is an indication to reduce the vehicle speed. This calls the attention of the driver of the own vehicle 50 to maintain the vehicle speed within the allowed speed limit of the ramp lane Wr.

In general, at least two or more ramp signs including a different speed limit symbol are installed in the forward direction of the own vehicle 50 along the ramp lane Wr in order to adequately reduce the vehicle speed of the own vehicle 50.

That is, the ECU 20 as the driving assistance device according to the exemplary embodiment detects the presence of a ramp lane, i.e. judges whether or not the current driving lane is a ramp lane, and detects that the current driving lane is a ramp lane when the following conditions are satisfied:

a plurality of detected traffic signs include a different speed limit symbol to each other; and a speed limit value indicated by each of the speed limit symbols in the detected traffic signs is reduced in the forward direction of the own vehicle 50.

Because the ECU 20 can recognize and judge the presence of the the ramp lane, it is possible for the ECU 20 as the driving assistance device to detect the exit of the ramp lane and the completion of the driving on the ramp lane with high accuracy.

In general, a ramp lane is located between a highway and a general roadway, and the ramp lane is short. The own vehicle 50 can leave the highway through the ramp lane. When the own vehicle travels on the ramp lane, the speed limit value indicated by each of the speed limit symbols in the detected traffic signs is gradually reduced in the forward direction of the own vehicle 50.

According to the speed limit value indicated by each of the speed limit symbols in the detected ramp signs, the driver of the own vehicle 50 may reduce the vehicle speed from the entrance to the exit of the extent of the ramp lane. This makes it possible to provide safe driving suitable for the ramp lane.

Usually, an entrance ramp sign is installed at the place of the entrance of a ramp lane Wr. The entrance ramp sign includes a speed limit symbol and an exit symbol, for example, a down arrow sign. The own vehicle can leave a highway through the ramp lane and enters a general roadway through the place of the exit of the ramp lane. In particular, no entrance ramp sign is installed on driving lane on highways and general roadways. The entrance ramp sign is installed on the ramp lane. Accordingly, it is possible for the ECU 20 as the driving assistance device to correctly detect the presence of a ramp lane in front of the current driving place of the own vehicle 50 when detecting the entrance ramp sign of the ramp lane which includes a combination of the exit symbol and the speed limit symbol.

Under the condition when the ECU 20 has detected the entrance ramp sign, it is possible for the ECU 20 to judges that the own vehicle 50 now travels on a driving lane on a highway, which is located adjacent to the detected ramp lane, when the distance Le between the entrance ramp sign and the own vehicle 50 is narrower than the predetermined distance Y.

Further, when the driver of the own vehicle 50 intends to change the own vehicle 50 toward the ramp lane, the driver of the own vehicle 50 moves the own vehicle 50 to the ramp lane from the driving lane Wh1. In this case, when the conditions (1), (2) and (3) previously described are satisfied, the ECU 30 judges that the own vehicle 50 has entered into the ramp lane Wr. This makes it possible to avoid incorrect detection of the entry of the own vehicle 50 into the ramp lane when the own vehicle 50 switches the driving lanes on the highway, instead of entering the ramp lane. This provides safe driving to the driver of the own vehicle 50.

(Various Modifications)

The concept of the driving assistance device (the ECU 20) and the driving assist method according to the present invention is not limited by the exemplary embodiment previously described.

For example, the following modifications are also acceptable. It is possible to perform the drive power control of the own vehicle 50 on the basis of the detection results regarding the entry of the own vehicle 50 into the ramp lane Wr, the completion of this entry, and on the basis of the judgment results of detecting the ramp lane Wr. It is acceptable for the ECU 20 as the driving assistance device to perform a gear shift down control when detecting the entry of the own vehicle 50 into the ramp lane Wr.

It is acceptable for the ECU 20 as the driving assistance device to detect the presence of a ramp lane by using traffic signs installed along the ramp lane, each including an exit symbol and a speed limit symbol. In other words, even if these ramp signs, each including the exit symbol and the speed limit symbol, are installed along the ramp lane Wr, the ECU 20 may detect the extent of the ramp lane on the basis of the arrangement of at least two or more the traffic signs (ramp signs), and a speed reduction pattern indicated by the speed limit symbols included in the detected traffic signs.

It is acceptable for the ECU 20 as the driving assistance device to detect, as the end place of the ramp lane Wr, the traffic sign at a predetermined number in the detected traffic signs, when the detected traffic signs are arranged in a predetermined speed reduction pattern, which is narrower than the predetermined distance. The number of traffic signs including a speed limit symbol arranged on a ramp lane is usually fixed. Because it is sufficient for the ECU 20 to perform the driving assistance control during a predetermined section in the ramp lane Wr, this control makes it possible to correctly detect the end place of the ramp lane Wr.

When a plurality of traffic signs including a speed limit symbol are arranged on the ramp lane Wr, it is acceptable for the ECU 20 as the driving assistance device to detect, as the end place of the ramp lane Wr, a place which is apart from the entrance of the ramp lane Wr by two or more traffic signs, counted from the entrance of the ramp lane Wr. In general, because the distance of the ramp lane has been determined, and it is sufficient for the ECU 20 to perform the driving assistance control during the ramp lane Wr having the predetermined distance, it is possible for the ECU 20 to detect the end place of the ramp lane Wr on the basis of this condition.

It is possible for the ECU 20 as the driving assistance device to use the predetermined reduction pattern which contains the same speed limits as long as the speed limit is reduced from the entrance to the end of the ramp lane Wr. For example, it is acceptable for the ECU 20 to use the speed reduction pattern from the entrance to the exit of the ramp lane Wr, which includes 90 km/h, 70 km/h, 70 km/h, 50 km/h and 30 km/h.

It is also acceptable for the ECU 20 to use a plurality of the speed reduction patterns, and detect the ramp lane when the arrangement pattern of the speed limit symbols in the traffic signs is matched with one of the speed reduction patterns.

It is acceptable for the ECU 20 as the driving assistance device to detect the entry of the own vehicle 50 into the ramp lane Wr when the conditions (1), (2) and (3) are satisfied regardless of the state of the condition (4). That is, it is possible to eliminate step S11 shown in FIG. 4. This modification would cause a possible incorrect detection regarding the entry of the own vehicle 50 into the ramp lane Wr when compared with a case of satisfying all of the conditions (1) to (4). However, this modification can also detect entry of the own vehicle 50 into the ramp lane Wr.

It is acceptable for the driver's intention detection section 23 in the ECU 20 as the driving assistance device to detect the driver's intention for the own vehicle 50 to change the current drive lane on the basis of a steering angle direction of the own vehicle 50 when a steering angle sensor 12 designated by a dotted line shown in FIG. 1 detects a steering angle and the ECU 20 receives a steering angle signal transmitted from the steering angle sensor 12.

Further, it is also acceptable for the driver's intention detection section 23 in the ECU 20 as the driving assistance device to detect the driver's intention for the own vehicle 50 to change the current drive lane on the basis of a yaw rate signal when the yaw rate sensor detects a yaw rate of the own vehicle 50 and the ECU 20 receives the yaw rate signal transmitted from the yaw rate sensor 13.

Still further, it is sufficient for the driver's intention detection section 23 to detect the driver's intention for the own vehicle 50 to change the current drive lane on the basis of at least one of the turning instruction signal transmitted from the turn signal indicator unit 11, the steering angle signal transmitted from the steering angle sensor 12, and the yaw rate signal transmitted from the yaw rate sensor 13.

When the own vehicle 50 has a radar unit 14 such as a millimeter-wave radar device designated by a dotted line shown in FIG. 1, it is possible to measure the distance in a width direction between the own vehicle 50 and the ramp lane Sg on the basis of distance information obtained by the radar unit 14. In this case, it is possible for the distance detection section 22 to calculate the distance Le between the own vehicle 50 and the ramp sign Wg on the basis of the distance information transmitted from the radar unit 14.

When the own vehicle 50 has a speaker unit 32, as one of the notification units, designated by a dotted line shown in FIG. 1, it is possible for the notification control section 25 to notify to the driver of the own vehicle 50 through the speaker unit 32 that the own vehicle 50 is now running on a ramp lane and the information regarding the speed limit of the ramp lane. It is also acceptable for the notification control section 25 to notify this information to the driver of the own vehicle 50 through the display unit 31 and the speaker unit 32. It is also acceptable for the notification control section 25 to notify this information to the driver of the own vehicle 50 through at least one of the display unit 31 and the speaker unit 32.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A computer system including a central processing unit, the computer system being configured to provide a driving assistance device comprising:
    a traffic sign detection section capable of detecting traffic signs including at least a speed limit symbol on a basis of front image data captured by an in-vehicle camera mounted on an own vehicle;
    a lane entry detection section capable of detecting that the own vehicle is entering a connection lane through which the own vehicle leaves a highway; and
    a judgment section capable of determining that a current driving lane, on which the own vehicle travels, is the connection lane when a first condition, a second condition and a third condition are satisfied after the lane entry detection section has detected the entry of the own vehicle into the connection lane, where
    the first condition indicates that the traffic sign detection section detects not less than two traffic signs arranged along the current driving lane in a forward direction of the own vehicle, the second condition indicates that a speed reduction pattern indicated by speed limit symbols included in the traffic signs detected by the traffic sign detection section in the forward direction of the own vehicle satisfies a predetermined speed reduction pattern, and the third condition indicates that a distance between the traffic signs detected by the traffic sign detection section in the forward direction of the own vehicle satisfies a predetermined distance.

2. The driving assistance device according to claim 1, wherein
    the judgment section detects an end place of the connection lane, when the speed reduction pattern indicated by the speed limit symbols included in the traffic sign detected by the traffic sign detection section in the forward direction of the own vehicle is different from the predetermined speed reduction pattern, or when a distance between the detected traffic signs adjacent to each other is wider than a predetermined distance, and
    the judgment section detects the extent of the connection lane as being from a place of entrance of the connection lane detected by the lane entry detection section to the end place of the connection lane.

3. The driving assistance device according to claim 2, further comprising:
    a notification control section capable of notifying, to the driver of the own vehicle through a notification unit, information regarding that the own vehicle now travels on the connection lane and a speed limit value corresponding to the speed limit symbol included in the detected traffic sign at a current location of the own vehicle when the own vehicle travels on the connection lane detected by the judgment section.

4. The driving assistance device according to claim 3, wherein the judgment section uses the predetermined speed reduction pattern which indicates that the speed limit symbols included in the detected traffic signs have different speed limit values to each other, and being reduced in the forward direction of the own vehicle.

5. The driving assistance device according to claim 3, further comprising:
   a distance detection section capable of detecting a distance in a width direction of the own vehicle between the own vehicle and the detected traffic sign, which includes an exit symbol and the speed limit symbol, the exit symbol providing for the own vehicle to leave the highway and enter the connection lane; and
   a driver's intention detection section capable of detecting a driver's intention for the own vehicle to change the current driving lane,
   wherein the lane entry detection section detects that the own vehicle has entered the connection lane when:
   the traffic sign detection section has detected the traffic sign including the exit symbol and the speed limit symbol;
   the distance detected by the distance detection section is narrower than a predetermined distance; and
   the direction of the own vehicle when changing the current driving lane detected by the driver's intention detection section is equal to the direction of the traffic sign including the exit symbol and the speed limit symbol.

6. The driving assistance device according to claim 2, wherein the judgment section uses the predetermined speed reduction pattern which indicates that the speed limit symbols included in the detected traffic signs have different speed limit values to each other, and being reduced in the forward direction of the own vehicle.

7. The driving assistance device according to claim 2, further comprising:
   a distance detection section capable of detecting a distance in a width direction of the own vehicle between the own vehicle and the detected traffic sign, which includes an exit symbol and the speed limit symbol, the exit symbol providing for the own vehicle to leave the highway and enter the connection lane; and
   a driver's intention detection section capable of detecting a driver's intention for the own vehicle to change the current driving lane,
   wherein the lane entry detection section detects that the own vehicle has entered the connection lane when:
   the traffic sign detection section has detected the traffic sign including the exit symbol and the speed limit symbol;
   the distance detected by the distance detection section is narrower than a predetermined distance; and
   the direction of the own vehicle when changing the current driving lane detected by the driver's intention detection section is equal to the direction of the traffic sign including the exit symbol and the speed limit symbol.

8. The driving assistance device according to claim 1, further comprising:
   a notification control section capable of notifying, to the driver of the own vehicle through a notification unit, information regarding that the own vehicle now travels on the connection lane and a speed limit value corresponding to the speed limit symbol included in the detected traffic sign at a current location of the own vehicle when the own vehicle travels on the connection lane detected by the judgment section.

9. The driving assistance device according to claim 8, wherein the judgment section uses the predetermined speed reduction pattern which indicates that the speed limit symbols included in the detected traffic signs have different speed limit values to each other, and being reduced in the forward direction of the own vehicle.

10. The driving assistance device according to claim 8, further comprising:
    a distance detection section capable of detecting a distance in a width direction of the own vehicle between the own vehicle and the detected traffic sign, which includes an exit symbol and the speed limit symbol, the exit symbol providing for the own vehicle to leave the highway and enter the connection lane; and
    a driver's intention detection section capable of detecting a driver's intention for the own vehicle to change the current driving lane,
    wherein the lane entry detection section detects that the own vehicle has entered the connection lane when:
    the traffic sign detection section has detected the traffic sign including the exit symbol and the speed limit symbol;
    the distance detected by the distance detection section is narrower than a predetermined distance; and
    the direction of the own vehicle when changing the current driving lane detected by the driver's intention detection section is equal to the direction of the traffic sign including the exit symbol and the speed limit symbol.

11. The driving assistance device according to claim 1, wherein the judgment section uses the predetermined speed reduction pattern which indicates that the speed limit symbols included in the detected traffic signs have different speed limit values to each other, and being reduced in the forward direction of the own vehicle.

12. The driving assistance device according to claim 1, further comprising:
    a distance detection section capable of detecting a distance in a width direction of the own vehicle between the own vehicle and the detected traffic sign, which includes an exit symbol and the speed limit symbol, the exit symbol providing for the own vehicle to leave the highway and enter the connection lane; and
    a driver's intention detection section capable of detecting a driver's intention for the own vehicle to change the current driving lane,
    wherein the lane entry detection section detects that the own vehicle has entered the connection lane when:
    the traffic sign detection section has detected the traffic sign including the exit symbol and the speed limit symbol;
    the distance detected by the distance detection section is narrower than a predetermined distance; and
    the direction of the own vehicle when changing the current driving lane detected by the driver's intention detection section is equal to the direction of the traffic sign including the exit symbol and the speed limit symbol.

13. A computer implemented driving assistance method performed by a driving assistance device mounted on an own vehicle, comprising steps of:

using a central processing unit (CPU), detecting traffic signs including a speed limit symbol on a basis of front image data captured by an in-vehicle camera mounted on an own vehicle;

using the CPU, detecting that the own vehicle enters a connection lane, through which the own vehicle leaves a highway; and using the CPU, detecting that a current driving lane, on which the own vehicle travels, is the connection lane as a ramp lane when a first condition, a second condition, and a third condition are satisfied after the entry of the own vehicle into the connection lane has been detected, where the first condition indicates that not less than two traffic signs arranged along the current driving lane in forward direction of the own vehicle are detected, the second condition indicates that an arrangement of speed limit symbols included in the detected traffic signs in the forward direction of the own vehicle satisfies a predetermined speed reduction pattern, and the third condition indicates that a distance between the detected traffic signs in the forward direction of the own vehicle satisfies a predetermined distance.

\* \* \* \* \*